United States Patent
Sohn et al.

(10) Patent No.: US 10,783,363 B2
(45) Date of Patent: Sep. 22, 2020

(54) METHOD OF CREATING MAP BY IDENTIFYING MOVING OBJECT, AND ROBOT IMPLEMENTING THE METHOD

(71) Applicant: LG ELECTRONICS INC., Seoul (KR)

(72) Inventors: Byungkon Sohn, Seoul (KR); Donghoon Kim, Seoul (KR); Han Shin Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 349 days.

(21) Appl. No.: 15/875,521

(22) Filed: Jan. 19, 2018

(65) Prior Publication Data
US 2018/0211103 A1   Jul. 26, 2018

(30) Foreign Application Priority Data
Jan. 25, 2017 (KR) .................. 10-2017-0012277

(51) Int. Cl.
| B25J 9/16 | (2006.01) |
| G05D 1/02 | (2020.01) |
| G06K 9/00 | (2006.01) |

(52) U.S. Cl.
CPC ........ G06K 9/00342 (2013.01); B25J 9/1666 (2013.01); B25J 9/1694 (2013.01); G05D 1/024 (2013.01); G05D 1/0274 (2013.01); *G05D 2201/0211* (2013.01)

(58) Field of Classification Search
CPC ....... B25J 9/1666; B25J 9/1694; G05D 1/024; G05D 1/0274; G05D 2201/0211; G06K 9/00342
See application file for complete search history.

(56) References Cited

U.S. PATENT DOCUMENTS

| 2001/0010541 A1* | 8/2001 | Fernandez ....... G08B 13/19608 348/143 |
| 2018/0043536 A1* | 2/2018 | Lee .......................... B25J 9/163 |
| 2019/0189006 A1* | 6/2019 | Toma .................... G08G 1/0968 |
| 2019/0246048 A1* | 8/2019 | Matsui ................... H04N 5/272 |
| 2020/0065982 A1* | 2/2020 | Oami ................. G06K 9/00348 |
| 2020/0103529 A1* | 4/2020 | Yeon ...................... G01S 5/0252 |

FOREIGN PATENT DOCUMENTS

| JP | 2007-249632 | 9/2007 |
| JP | 2010-134656 | 6/2010 |
| JP | 2013-086234 | 5/2013 |
| JP | 2013086234 A * | 5/2013 |

OTHER PUBLICATIONS

Korean Office Action dated Nov. 16, 2018 issued in KR Application No. 10-2017-0012277.

* cited by examiner

Primary Examiner — Robert T Nguyen
(74) Attorney, Agent, or Firm — Ked & Associates, LLP

(57) ABSTRACT

The present disclosure relates to creating a map by identifying a moving object, and a robot implementing the method, and the method comprises, by a sensing unit of a robot, sensing a first object located outside the robot, by a control unit of the robot, calculating mobility of the sensed first object, and storing sensed information and sensed time information of the first object in a map, as a fixed object, when the mobility of the first object calculated by the control unit of the robot is lower than a preset reference.

20 Claims, 14 Drawing Sheets

FIG. 10

| Serial | Xpos | Ypos | SensingTime |
|---|---|---|---|
| 34234 | 3 | 5 | 2016-12-13 10:15 |
| 34235 | 3 | 5 | 2016-12-13 11:15 |
| 34236 | 3 | 5 | 2016-12-13 13:15 |
| 34237 | 3 | 5 | 2016-12-20 10:15 |
| 34238 | 3 | 5 | 2016-12-20 11:15 |
| 34239 | 3 | 5 | 2016-12-20 13:15 |
| 34240 | 3 | 5 | 2016-12-27 10:15 |
| 34241 | 3 | 5 | 2016-12-27 11:15 |
| 34242 | 3 | 5 | 2016-12-27 13:15 |

230

| Serial | Xpos | Ypos | SensingTime | Duration | Period | Movability |
|---|---|---|---|---|---|---|
| 432 | 2 | 4 | 2016-12-13 11:35 | NULL | NULL | 5 |
| 433 | 10 | 17 | 2016-12-13 14:35 | NULL | NULL | 5 |
| 434 | 16 | 15 | 2016-12-13 16:24 | 12:53 | NULL | 2 |
| ⋮ | | | | | | |
| 512 | 3 | 5 | 2016-12-27 13:15 | 3:00 | Weekly (TUE, 10:15, 13:15) | 5 |

220b

730

FIG. 12
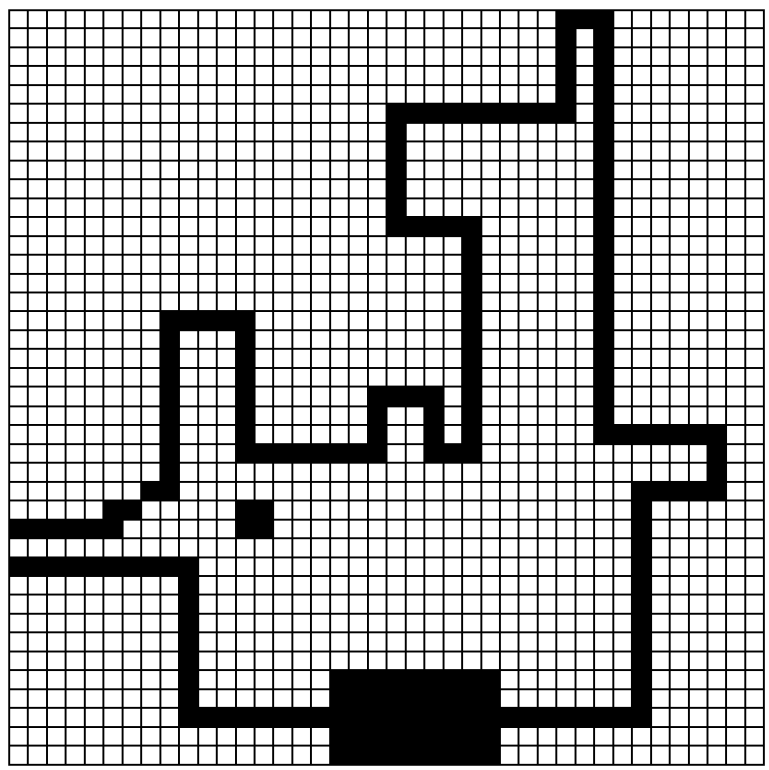
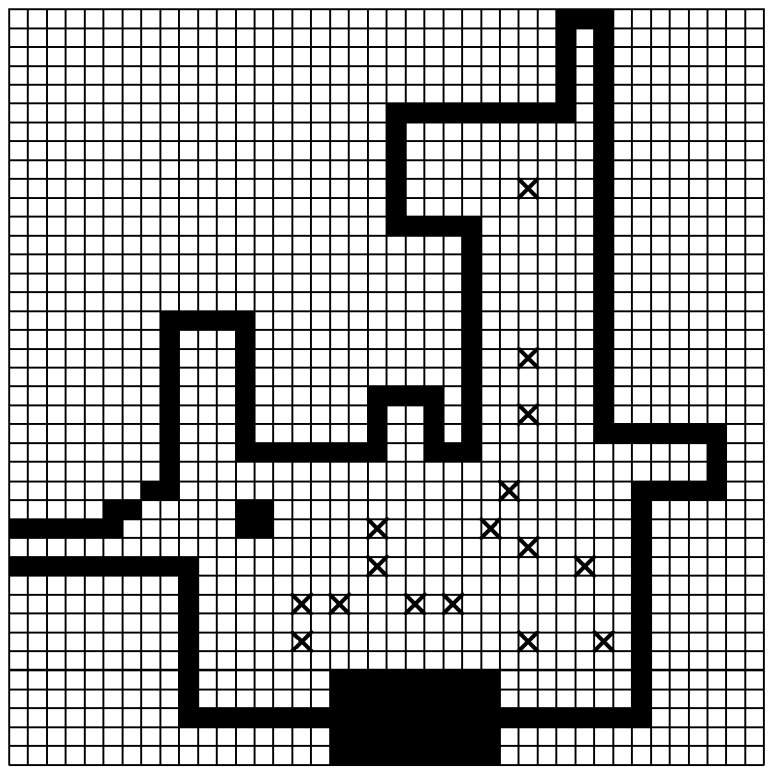
■ Fixed object
☒ Moving object

METHOD OF CREATING MAP BY IDENTIFYING MOVING OBJECT, AND ROBOT IMPLEMENTING THE METHOD

CROSS-REFERENCE TO RELATED APPLICATION

This application claims priority under 35 U.S.C. § 119 to Korean Application No. 10-2017-0012277, filed on Jan. 25, 2017, whose entire disclosure is hereby incorporated by reference.

BACKGROUND

1. Field

The present disclosure relates to a method of creating a map by identifying a moving object, and a robot implementing the method.

2. Background

In order for a robot to operate in a space where human and material exchanges actively occur, such as airports, schools, government offices, hotels, offices, factories and so on, the robot has to have a map on the whole space. In addition, it is necessary to identify dynamic changes occurring in the whole space and to distinguish between temporary space changes clue to the dynamic changes and permanent space features that should be applied to the map. In particular, it is necessary to grasp not only the structure of buildings but also the movement of various moving objects in a space where a large number of people move, such as an airport, a port and a train station.

However, there is a problem that moving objects exist in a space that s constantly used by people, such as an airport, a port and a train station. Therefore, it is necessary for the robot to distinguish it from a fixed region of the map. Accordingly, in order to solve such a problem, there is a need for a technique for accumulating information on a moving object grasped by a robot while moving, and analyzing the accumulated information to distinguish from a region on a map where a fixed object is located.

BRIEF DESCRIPTION OF THE DRAWINGS

The embodiments will be described in detail with reference to the following drawings in which like reference numerals refer to like elements, and wherein:

FIG. 10 is a view for explaining storage of periodicity of a moving object in a moving object storage unit according to an exemplary embodiment of the present disclosure;

FIG. 12 is a view showing an example in which a moving object of a map storage unit is displayed on a map and an example in which a moving object of the map storage unit is not displayed on the map according to an embodiment of the present disclosure;

DETAILED DESCRIPTION

In the following description, a robot comprises a moving device having a specific purpose (cleaning, security, monitoring, guidance, etc.) or providing functions according to the characteristic of a space in which the robot moves. Therefore, in the following description, the robot refers generally to a device that has a moving mechanism capable of moving by using predetermined information and a sensor and provides predetermined functions.

The robot can move while holding or storing a map. The map means information about a fixed wall, a stair and the like that are identified not to move in a space. In addition, the robot can store information on separate objects on the map. For example, a guide platform attached to a fixed wall, a newly installed vending machine, etc., are not fixed objects but have fixability for a certain period of time, so they need to be stored as additional fixtures in the map. On the other hand, even if a person is always present in a certain space, the person is predicted to move. Therefore, when the space is formed as a map having a fixed obstacle, a function for the space may not be completed.

Figure 1:
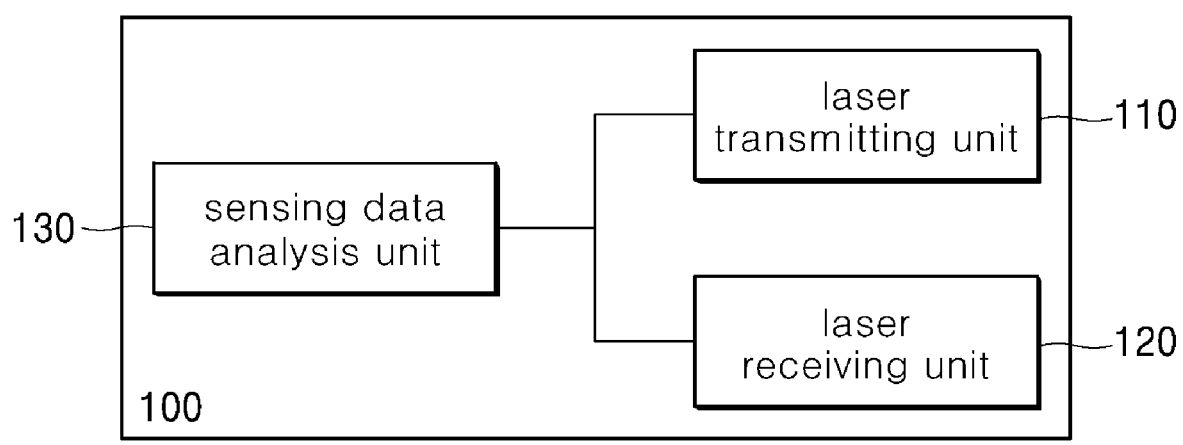
FIG. 1 is a view showing the configuration of a LiDAR sensor according to an embodiment of the present disclosure.

FIG. 1 is a view showing the configuration of a light detection and ranging (LiDAR) sensor according to an embodiment of the present disclosure. In one embodiment of the present disclosure, a robot may use a LiDAR sensor to supplement a map or identify a moving object. The LiDAR sensors can sense a distance to an object, a direction of the object, velocity and temperature of the object, distribution and concentration of materials and the like through the reflection of laser emitted to an external obstacle or a moving object. To this end, a sensing unit (or sensor) 100 comprising the LiDAR sensor may comprise a laser transmitting unit (or emitter) 110 emitting a laser light, a laser receiving unit (or detector) 120. The sensing unit 100 may further comprise a sensing data analysis unit (or processor) 130 for analyzing a received signal. The laser transmitting unit 110 may use a laser having a specific wavelength or a laser light source capable of varying a wavelength. The sensing data analysis unit 130 may analyze information such as a distance to a sensed object or temperature and velocity of the sensed object and provide the analyzed information to a robot equipped with the sensing unit 100.

FIG. 1 shows the configuration of a LiDAR sensor using a laser as one example of the sensing unit. However, the present disclosure is not limited thereto, but various sensors such as an ultrasonic sensor and an infrared sensor may be used to identify a moving object. In addition, two or more sensors may be used to identify a moving object by reflecting the characteristics of information identified by the respective sensors.

Figure 2:
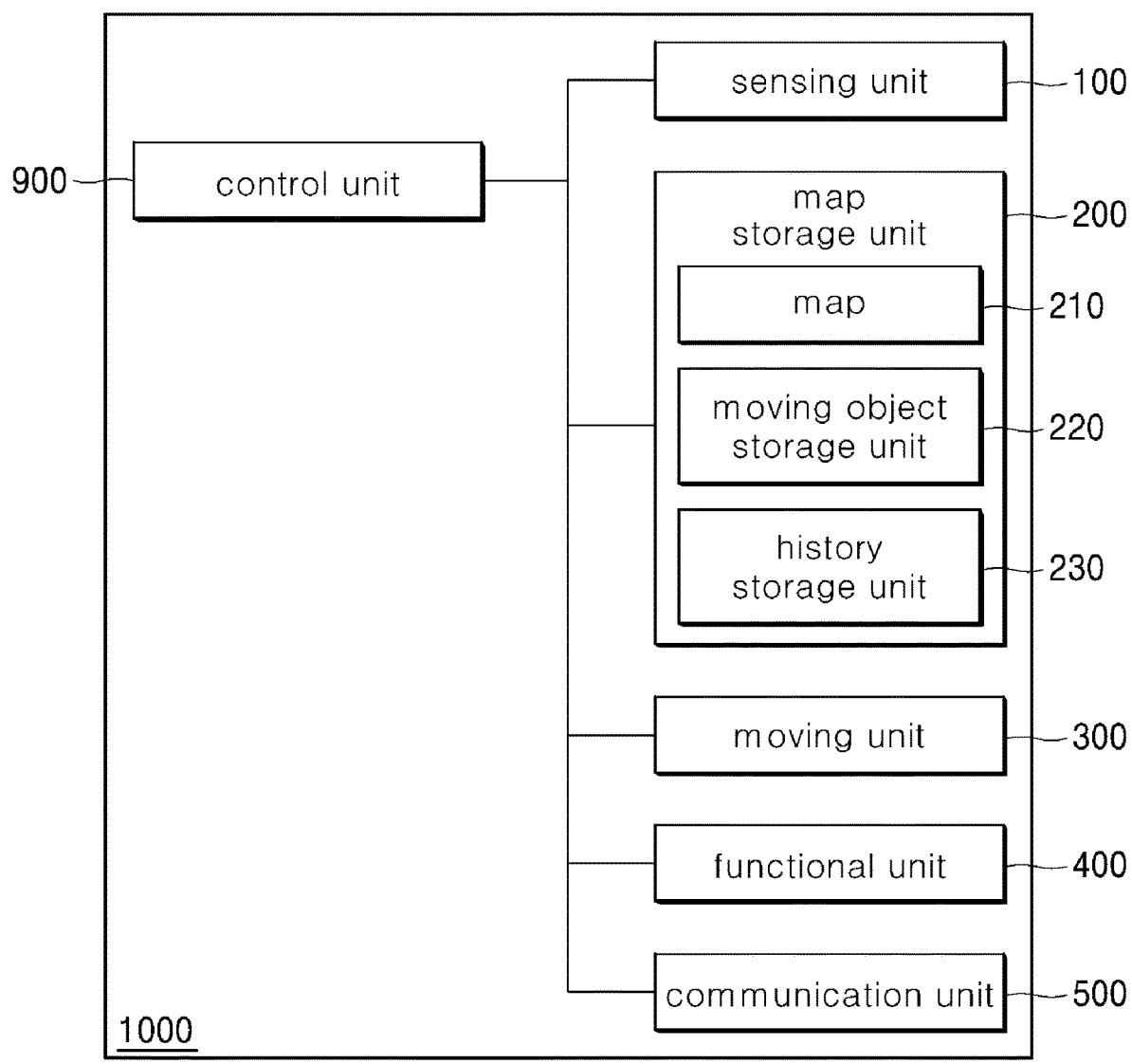
FIG. 2 is a view showing the configuration of a robot according to an embodiment of the present disclosure.

FIG. 2 is a view showing the configuration of a robot according to an embodiment of the present disclosure. Referring to FIG. 2, a robot 1000 comprises a sensing unit 100 for sensing an external moving object or fixed object, a map storage unit (or memory) 200 for storing a map, a moving unit (or motor) 300 for controlling movement of the robot 1000, a functional unit 400 for performing a predetermined function of the robot, a communication unit (or communication interface) 500 for exchanging the map or information on the moving object or the fixed object with other robots, and a control unit (or controller) 900 for controlling these respective components. If there is a sensed object, the control unit 900 can calculate the mobility of the object. In addition, depending on whether the sensed object is a fixed object or a moving object, the mobility can be stored in the map storage unit 200 in a different manner and information.

The moving unit 300 is a mechanism for moving the robot 1000, such as a wheel driven by a motor, and moves the robot 1000 under control of the control unit 900. At this time, the control unit 900 can use the information stored in the map storage unit 200 to confirm (or check) the current position of the robot 1000, and provide a movement signal to the moving unit 300. In addition, the control unit 900 can determine the presence of an external object sensed by the sensing unit 100 to control the movement of the moving unit 300. The functional unit 400 provides a specialized function of the robot. For example, in case of a cleaning robot, the functional unit 400 comprises components required for cleaning (such as a cleaning head). In case of a guidance robot, the functional unit 400 comprises components required for guidance. The functional unit 400 may comprise various components depending on functions provided by the robot.

The map storage unit 200 stores a map 210 or includes a map memory 210 to store the map. The map means information on a space in which the robot 1000 can move. The map 100 may comprise information on location of fixed objects in subdivided unit regions of the whole space or information on the height and material of the fixed objects.

In addition, the map storage unit 200 comprising the map 210 may further comprise a moving object storage unit (or moving object memory) 220 for storing information on moving objects. For example, the moving object storage unit 220 stores moving objects discovered at specific positions, information on the time when the moving objects are sensed or the time information periodically sensed, etc. This is to enable the robot 1000 to move to the corresponding position even when an object is determined as a moving object.

In an embodiment of the present disclosure, the map 210 stores information on a fixed object, and typically stores information on a fixed structure such as a wall, glass, a column and the like. On the other hand, the moving object storage unit 220 stores information on moving objects or transient objects. Alternatively, in another embodiment of the present disclosure, the map 210 and the moving object storage unit 220 may be integrated but a fixed object and a moving object may be separately stored, as will be described later with reference to FIG. 13.

The map storage unit 200 may further comprise a history storage unit (or history memory) 230 for accumulating and storing time information of an object sensed at a specific position. The history storage unit 230 may be constructed in a separate server for providing information to the robot 1000.

It is illustrated in FIG. 2 that the map storage unit 200 is comprised in the robot 1000. However, in another embodiment, the map storage unit 200 may be comprised in a server. In this case, the robot 1000 can receive the map stored in the server in real time or at a predetermined time interval in communication with a communication unit of the server. Further, the robot 1000 can transmit further information to be stored to the server.

The map may be configured in various ways. In one embodiment, the whole space may be divided into unit regions on an XY axis basis, and the map may comprise information on the location of a fixed object or a moving object in each unit region.

In one embodiment of the present disclosure, the control unit 900 may calculate the mobility of an object sensed by the sensing unit 100. If a value of the mobility is smaller than a preset reference value, the control unit 900 determines the sensed object as a fixed object or an object located periodically and stores sensed position information and sensed time information of the sensed object in the map as the fixed object. On the other hand, if the value of the mobility is larger than or equal to the preset reference value, the control unit 900 may store the sensed position information and the sensed time information of the sensed object in the moving object storage unit 220.

Figure 3:
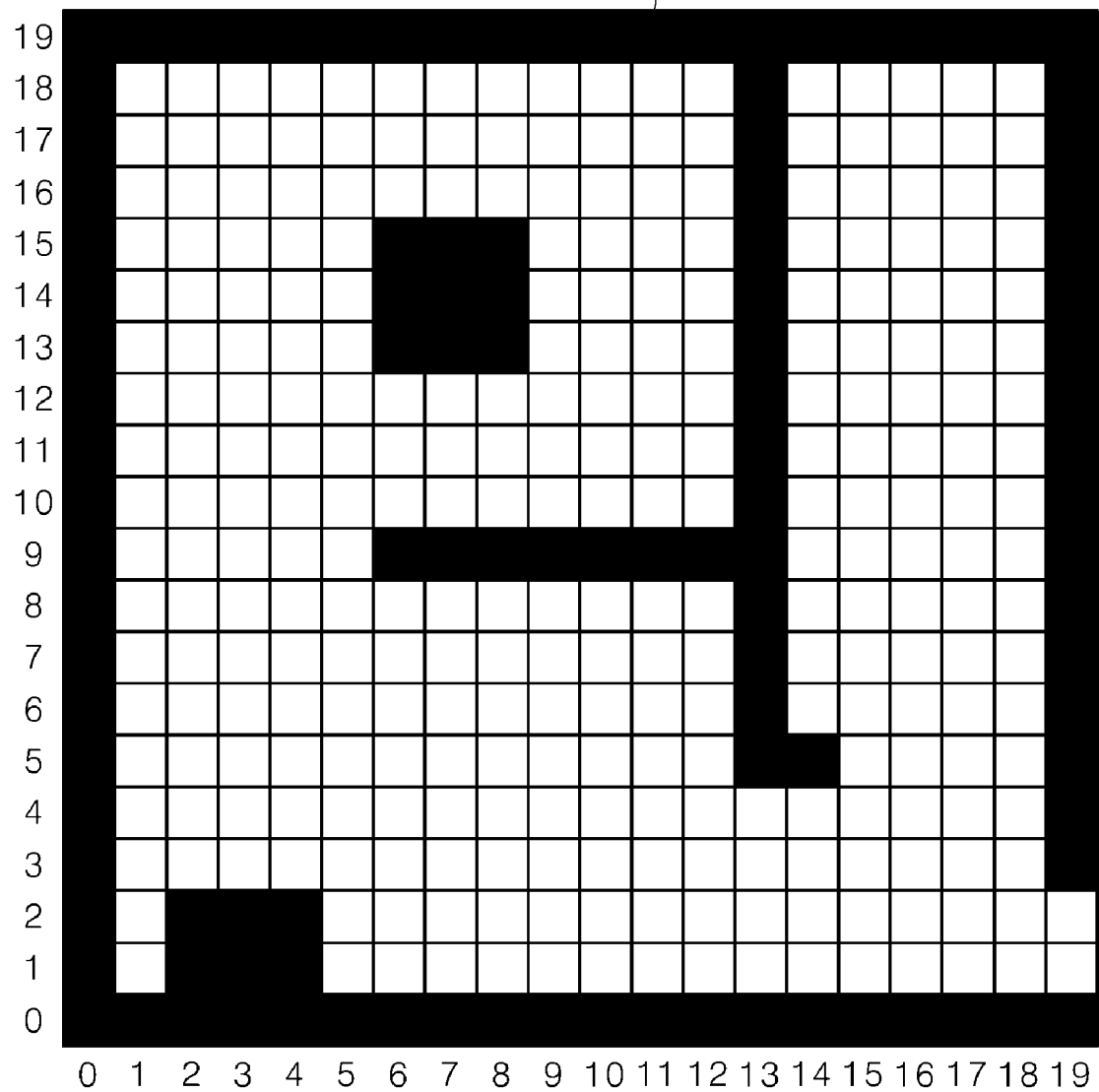
FIG. 3 is a view showing an example map in which a space is composed of unit regions according to an embodiment of the present disclosure.

In the following description, the map storage unit 200 comprises the map 210 in FIG. 3 and the moving object storage unit 220 in FIG. 4. FIG. 3 is a view showing an example map 210 in which a space is composed of unit regions according to an embodiment of the present disclosure. When the unit regions of the map 210 are expressed by 20×20 as shown in FIG. 3, a unit region in black has information on a space in which fixed objects such as a wall, glass and the like are located. A unit region in white indicates a space in which the robot 1000 can move because there is no object such as an obstacle.

In FIG. 3, the map 210 may be configured as a kind of bit map in the form of an image file, in which each bit in the bitmap represents one unit region. The unit regions may be expressed by the left bottom (0,0) to the right top (19,19). In addition, the map 210 of FIG. 3 may have a 20×20 data structure. For example, the map 210 may comprise information on location of an object at each position. When information is arranged in the form of a matrix and a fixed object is located, a value of the corresponding matrix can be set to a predetermined value.

In addition, the map storage unit 200 may store information on moving objects in addition to the map 210 composed of fixed objects. FIG. 4 is a view showing a moving object storage unit in which information on a moving object is stored according to an embodiment of the present disclosure. In one embodiment of the present disclosure, when the sensing unit 100 of the robot 1000 identifies an object that is not recorded in the map 210, the position information and time information of a sensed object may be stored in the moving object storage unit 220. In FIG. 4, reference numeral 220 indicates information of sensed moving objects.

The information 220 may comprise a serial number (Serial), position information (Xpos, Ypos) of a sensed moving object, sensed time (Time), a sensing duration (Duration) of a moving object at the corresponding position, a sensing period (Period) of a moving object at the corresponding position, and optionally the mobility of the corresponding object. In one embodiment, the mobility is assumed to have a value between 0 and 5, but the present disclosure is not limited thereto.

Figure 13:
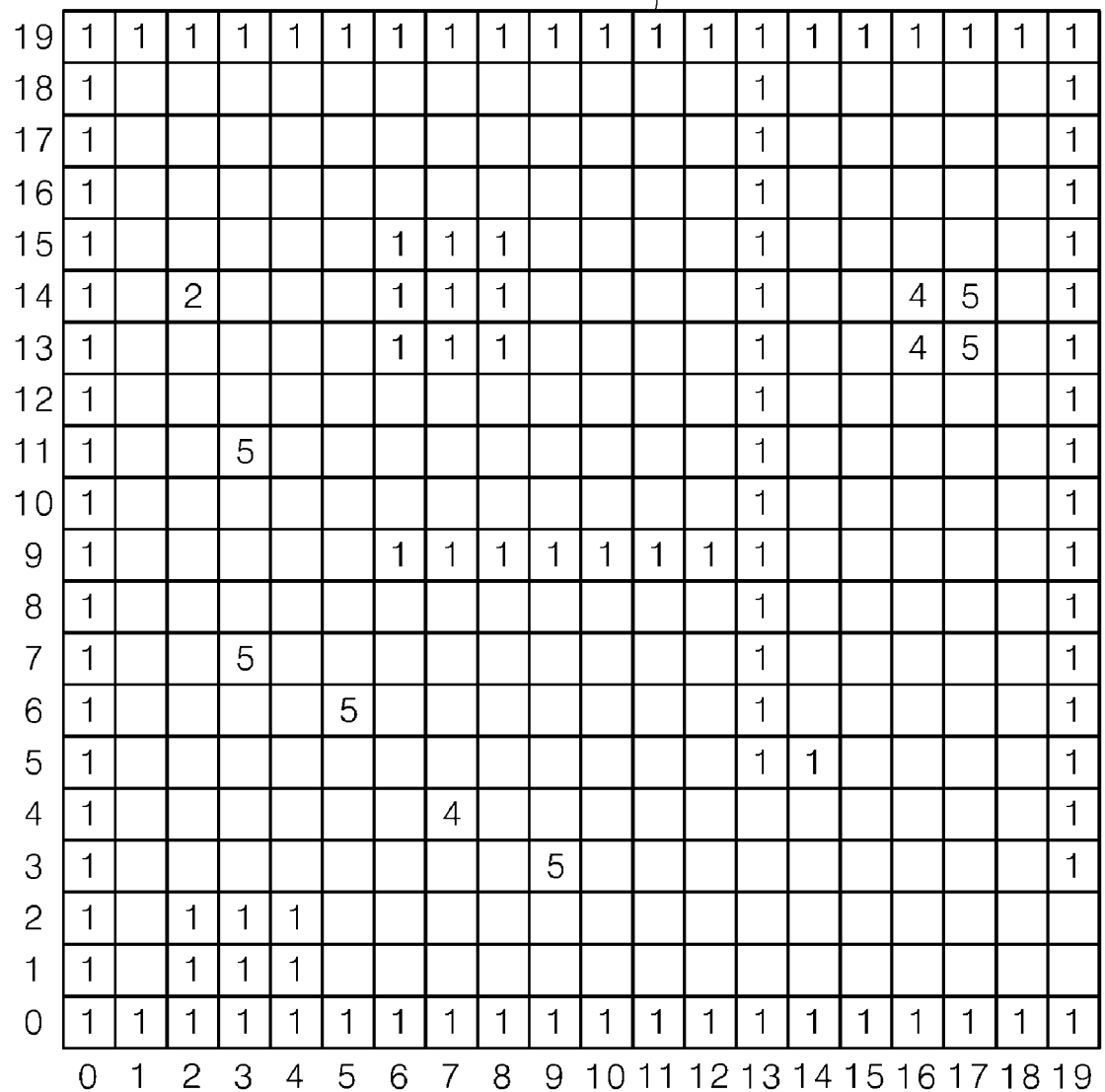
FIG. 13 is a view showing information on a fixed object and a moving object in one map according to another embodiment of the present disclosure.

The mobility is information indicating a moving degree or a movable degree of an object. As shown in FIG. 4, the mobility may be represented as a number or a specific alphabetic character. In addition, the mobility may provide grouped information of the moving degrees or movable degrees. For example, objects to move or predicted to move within 3 seconds are comprised in a group set with a value 5 of "Mobility". Objects to move or predicted to move between 3 seconds and ten seconds are comprised in a group set with a value 4 of "Mobility". Similarly, objects to move or predicted to move within a certain time range may be comprised in groups set with value 3, 2 and 1 of "Mobility". These values are used to create a map based on the mobility of objects in a space and to move the objects based on the created map, as shown in FIG. 13 to be described later.

When the mobility is based on the secured map, the robot can generate a moving path differently. In one embodiment, the robot may generate a path along which the robot can travel while reducing a collision, based on the characteristics (mobility) of objects located in a space.

For example, a moving object with a serial number of 432 is sensed at (2, 4) at "2016 Dec. 13 11:35", and it can be confirmed through the "Duration" field that the object has not been previously sensed. A moving object with a serial number of 433 is sensed at (10, 17) at "2016 Dec. 13 14:35", and similarly, it can be confirmed through the "Duration" field that the object has not been previously sensed.

For example, a moving object with a serial number of 434 is sensed at (16, 15) at "2016 Dec. 13 16:24", and it can be confirmed through the "Duration" field that the object has been sensed from before 12 hours and 53 minutes. The sensing duration may be calculated based on information sensed by the robot 1000 while moving through the same position at different times. In another embodiment, the communication unit 500 may receive and update information provided by another robot.

Figure 5:
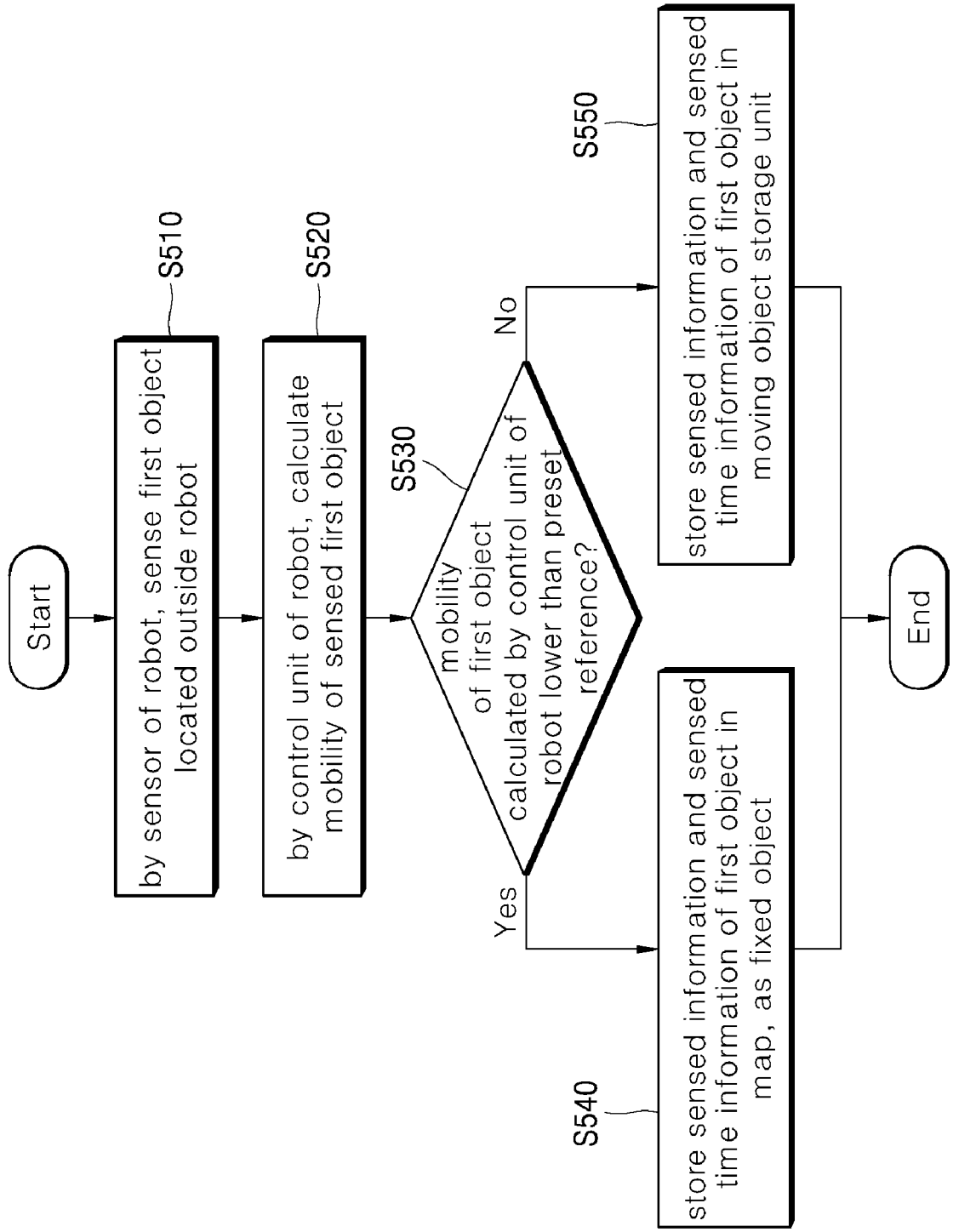
FIG. 5 is a flowchart showing a process of sensing a moving object different from a map by a control unit of the robot according to an embodiment of the present disclosure.

Now, according to the above-described configuration, a process of discriminating a dynamically moving obstacle using each component of the robot 1000 and distinguishing the obstacle from a fixed object in a map will be described. FIG. 5 is a flowchart showing a process of sensing a moving object different from a map by a control unit of the robot according to an embodiment of the present disclosure.

First, the sensing unit 100 of the robot senses a first object located outside the robot (S510). The sensing unit 100 senses the external first object in such a manner that the laser transmitting unit 110 constituting the LiDAR sensor transmits a laser signal and then the sensing data analysis unit 130 analyzes a signal received by the laser receiving unit 120.

Thereafter, the control unit 900 calculates the mobility (or mobility value) of the sensed first object (S520). The mobility means to determine how a sensed object moves. For example, although not a fixed object such as a wall or glass, a trash or a guide sign that is maintained for a predetermined period after being installed once may be continuously sensed after being sensed once, which means that it has low mobility and may be handled as a fixed object. In one embodiment, the mobility can be calculated based on the presence of the corresponding object at the corresponding position and the time at which the corresponding object is sensed. For example, if a period for which an object can be determined as a fixed object is one day (24 hours), the closer to 24 hours, the lower the mobility.

Thereafter, when the mobility of the first object calculated by the control unit 900 of the robot is lower than a preset reference (S530), this may mean that the first object has low mobility. Therefore, in order to allow the first object to be handled as a fixed object when the robot moves in the future, the sensed position information and the sensed time information of the first object are used for the fixed object and stored in the map (S540). However, if the first object has some mobility, it can be distinguished from other fixed objects. For example, the first object may be stored separately from a completely fixed structure, as displayed in gray, rather than in black in the map of FIG. 3.

Figure 4:
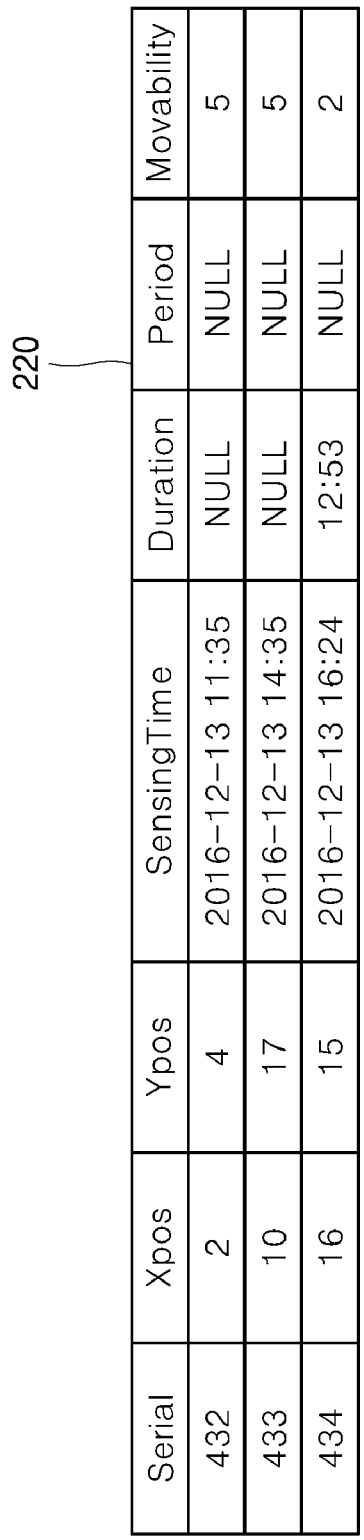
FIG. 4 is a view showing a moving object storage unit in which information on a moving object is stored according to an embodiment of the present disclosure.

On the other hand, if the mobility of the first object is higher than or equal to the preset reference in S530, the sensed information and the sensed time information of the first object may be stored in the moving object storage unit (220 in FIG. 4). The sensed information may comprise position information. In the sensed information, the sensed position information may be information on a distance or direction between the current position of the robot and the sensed object. The current position of the robot can reflect the map 210 and the movement result of the moving unit 300 to identity the position of the robot in the map 210. In another embodiment, the current position of the robot can be correctly determined from the outside.

Figure 6:
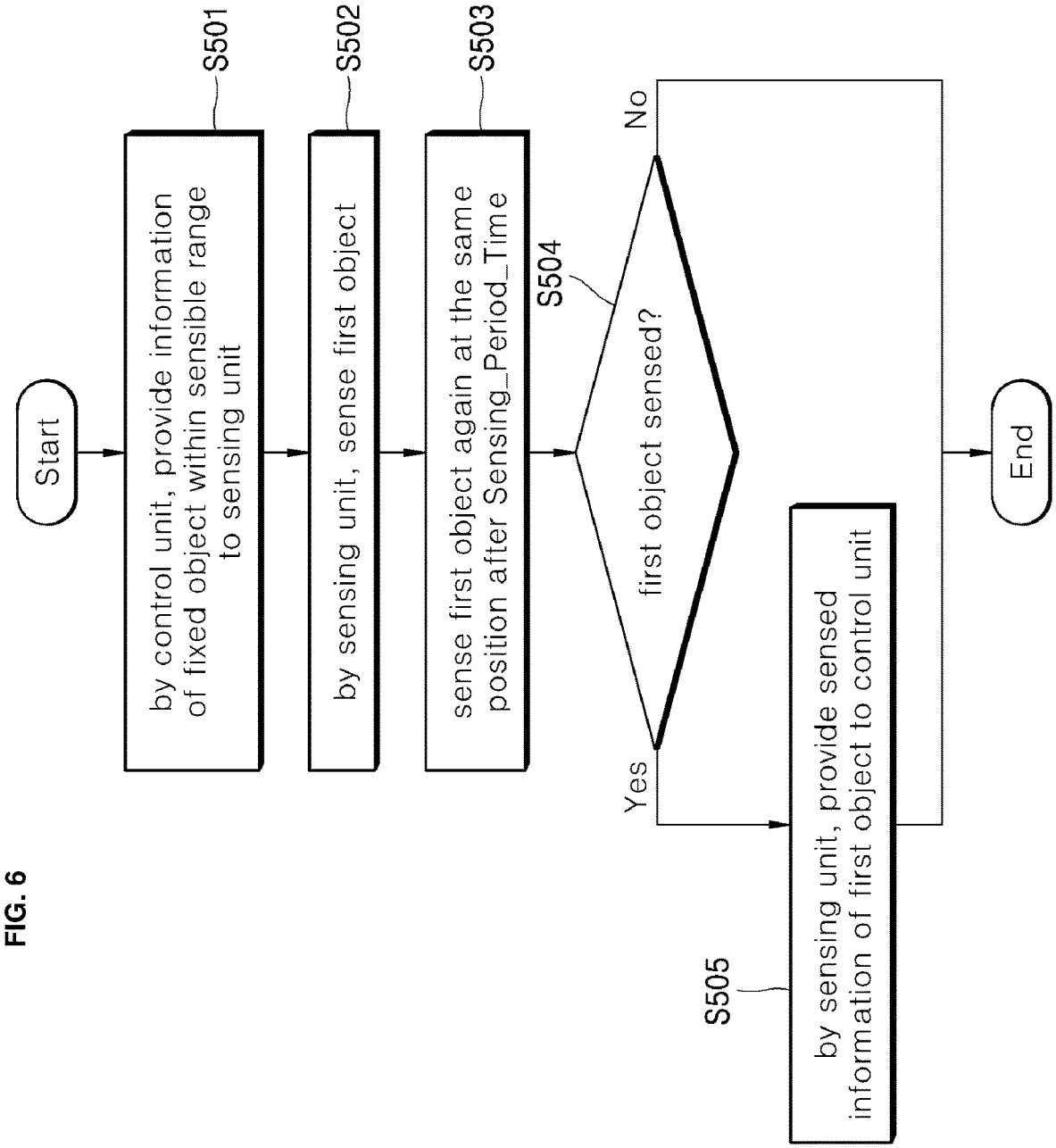
FIG. 6 is a flowchart showing a process of sensing an external object at a time interval by a sensing unit according to an embodiment of the present disclosure.

FIG. 6 is a flowchart showing a process of sensing an external object at a time interval by a sensing unit according to an embodiment of the present disclosure. In an embodiment of the present disclosure, the sensing unit 100 confirms whether a sensed object is a moving obstacle or a fixed object. In the case where the sensed object is a moving obstacle such as a person or a baggage, it has a high possibility of moving rather than staying in one place.

In one embodiment of the present disclosure, when the robot 1000 provides a cleaning function or a detection function for detecting each space, it is necessary for the robot 1000 to enter the corresponding space after the obstacle has moved to perform a predetermined function. Accordingly, in a case where an external object is sensed, rather than notifying the control unit 900 that the external object is a moving object, the sensing unit 100 of the present disclosure may first confirm (i.e., check) whether or not the object is sensed even after a predetermined time and then, if the object continues to be sensed, may notify the fact to the control unit 900.

That is, the sensing unit 100 may be configured not to notify the control unit 900 of an external first object that is not sensed again after being sensed for a short time. However, in a space where the flow population is large, the first object disappears after being continuously sensed. Therefore, even if the first object is sensed in accordance with the movement of the floating population, the sensing unit 100 attempts to sense the first object again after a preset time, Sensing_Period_Time (such as 0.1 second or 1 second) and, only when it is confirmed that the first object exists for a longer time than Sensing_Period_Time, may notify the first object to the control unit 900 of the robot. For this, the control unit 900 may provide the sensing unit 100 with information indicating that there is no fixed object within a certain range based on the map information of the map storage unit 200.

The Sensing_Period_Time may be set in advance or may be automatically changed according to the characteristics of the time when the robot 1000 travels. For example, when the floating population is very large, people may leave from a location and then new people may move to that location. In this case, the Sensing_Period_Time may be set longer. There are not many people moving at a time when the floating population is small. In this case, the Sensing_Period_Time may be set shorter because people are not likely to stay in a certain position. Alternatively, unlikely the above, since sensed objects may be constantly present due to the increase of the flow population, the Sensing_Period_Time may be set to be rather short to confirm whether the object is a moving object.

The above-mentioned process will be described below in more detail. The control unit 900 provides the sensing unit 100 with information on the fixed object within a sensible range (S501). For example, if a distance which can be sensed by the sensing unit 100 is 5 meters, the provided information may comprise information indicating that no fixed object exists within 5 meters or information indicating that a fixed object exists at a left 3 meter point within 5 meters. Using this information, the sensing unit 100 can notify the control unit 900 directly of the fixed object if it is determined that the object is a fixed object when it is sensed. If it is determined that the moving object is not a fixed object, the moving object may be sensed again as shown in FIG. 6.

When the first object is sensed (S502), the sensing unit (100) senses the first object again at the same position after the preset Sensing_Period_Time (S503). When the first object is sensed again (S504), it is determined that the first object is continuously sensed, and the sensing unit 100 provides the sensed information of the first object to the control unit 900 (S505).

Here, if a person A moves to a specific position and then a person B moves to the same position, the sensing unit 100 may sense the person A and the person B in succession, determining that the first object exists. That is, the first object sensed by the sensing unit 100 in S502 in FIG. 6 does not necessarily have to be the same as the first object sensed by the sensing unit 100 in S505.

In the embodiment of FIG. 6, the robot may perform the process of FIG. 6 while moving depending on the sensor type. For example, when a sensing distance is long as in the case of LiDAR sensor, the sensing data analysis unit 130 may store information about an object sensed at a long distance and may sense the sensed object again in this process. If an object is sensed in the traveling direction but is not sensed during the movement, the sensing data analysis unit 130 deletes the object and does not notify it to the control unit 900.

On the other hand, if the object sensed in the traveling direction is continuously sensed, the control unit 900 is notified of the sensed object. For this, the sensing data analysis unit 130 may compare the first sensed object with the object sensed after movement.

For example, when an object is sensed 10 meters ahead in the travelling direction, the sensing data analysis unit 130 stores information indicating that the object exists 10 meters ahead. If the object is sensed in front of 5 meter after proceeding 5 meters, then the object is again sensed in front of 1 meter after proceeding 1 meter, the control unit 900 is provided with the information indicating that the object is sensed one meter ahead in the travelling direction.

On the other hand, if the object is sensed 5 meters ahead northeast in the north travelling direction, the sensing data analysis unit 130 stores the information on the sensed object.

Thereafter, if the object is sensed 2.23 meters east in the north travelling direction, this means that the previously sensed object is located as it is. Therefore, the control unit 900 is provided with the information that the object is sensed 2.23 meters east in the travelling direction. In order to implement the above-described embodiment, the sensing data analysis unit 130 may additionally hold the moving object storage unit 220 shown in FIG. 4.

Figure 7:
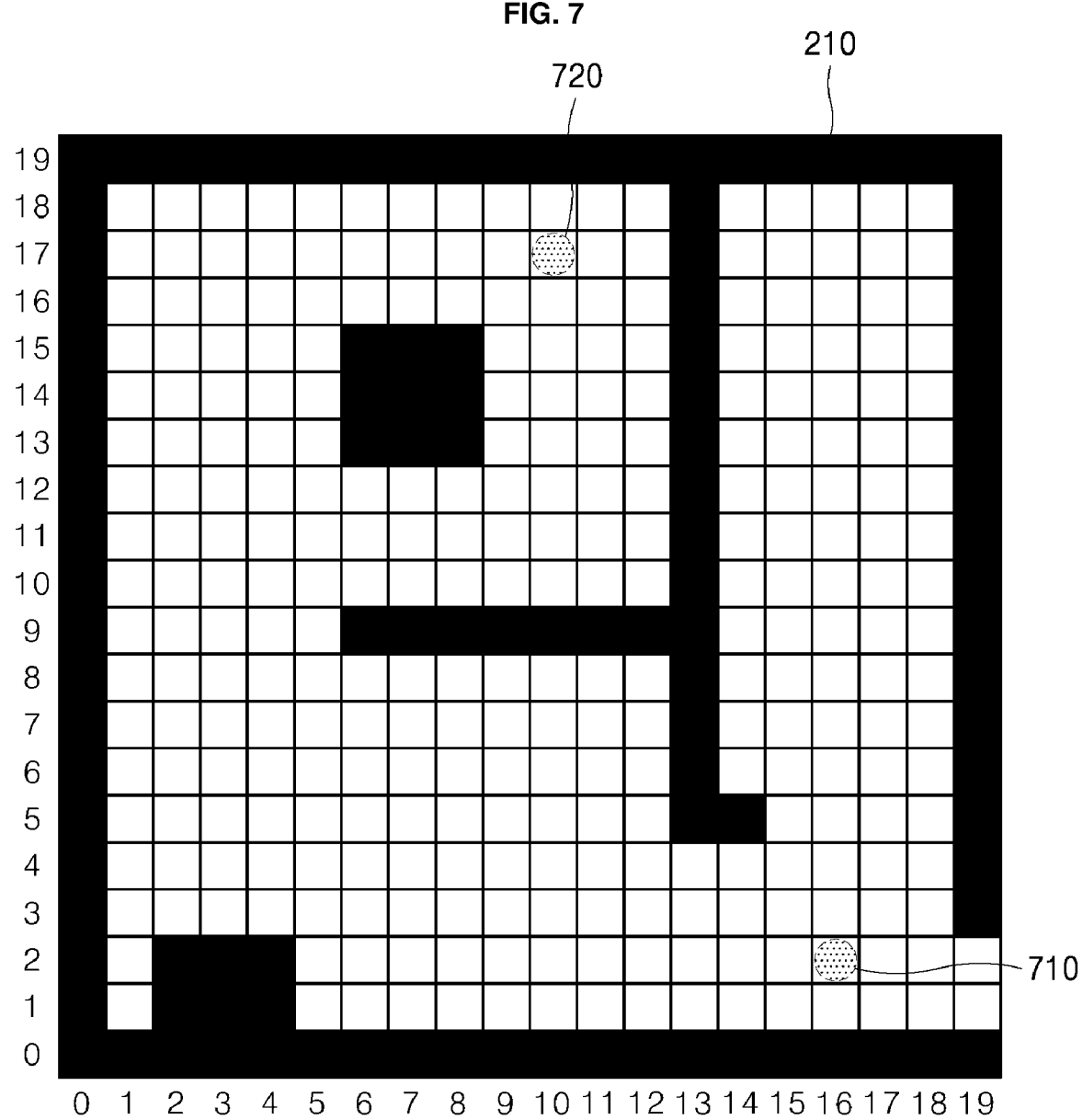
FIGS. 7 and 8 are views showing a process of calculating mobility of a sensed object according to an embodiment of the present disclosure.
Figure 8:
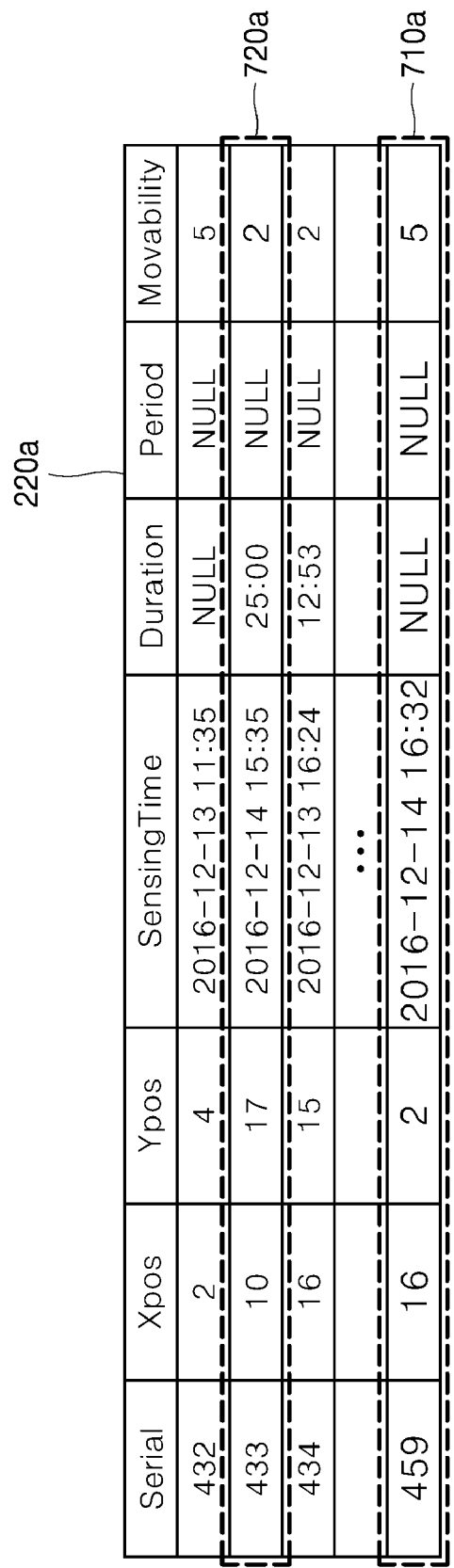

FIGS. 7 and 8 are views showing a process of calculating mobility of a sensed object according to an embodiment of the present disclosure, which corresponds to S520 in FIG. 5. The control unit 900 may compare the sensed object with the map 210 of FIG. 7 for such a fixed structure as a fixed object in the map storage unit 200. It is confirmed whether or not the sensed first object 710 provided by the sensing unit 100 matches the fixed object in the map 210. If there is a fixed object adjacent to the first object 710, it may be determined as a fixed object. However, if the position of the fixed object of the map does not match the position of the sensed first object, the control unit 900 of the robot may increase the mobility (or mobility value).

FIG. 8 shows an embodiment in which the value of the mobility of the object is increased to 5 and stored in a moving object storage unit 220a as indicated by 710a. If the position of the fixed object of the map does not completely but partially match the position of the sensed first object, the control unit 900 of the robot may determine that the fixed object is a moving object due to an error of the map or a mechanical error which may occur in the course of movement of the robot. In this case, the value of the mobility is set to be as low as 3 or 4. If the object is still sensed in the next running or another movement but is not moved, it can be determined that the object is a fixed object, and the map can be modified. This comprises a function of correcting an error initially generated in the process of generating the map by the robot.

Meanwhile, when the object 720 is sensed again at the position previously stored in the moving object storage unit, the control unit 900 may calculate the mobility for the object 720. That is, the object 720 is an object sensed at the same position as the object with the serial number 433 of the moving object storage unit 220 shown in FIG. 4. That is, the control unit can confirm whether or not to store the second object corresponding to the position of the first object, the storage period or the storage interval in the moving object storage unit, and may change the mobility according to the confirmed information. In FIG. 8, reference numeral 720a shows that "SensingTime" and "Duration" are changed and the value of "Movability" is changed from 5 to 2. If the object 720 in FIG. 7 is sensed again, its "Movability" is changed to 1, and it can be recognized as a fixed object and the map can be updated. The criterion for determining the fixed object can be variously configured according to the operating environments of the system and the robot.

According to the above-described embodiment, it is possible to continuously determine whether the sensed object is a static obstacle or a moving obstacle without directly registering all the information coming into a laser distance sensor such as the LiDAR sensor, and register only static obstacle information in the map. Since x and y of the entire map coordinate system can be extracted by calculating distance information and angle information of a specific object obtained from the laser sensor as the current position information of the robot, the x and y coordinate values of the specific object can be stored in the moving object storage units 220 and 220a shown in FIGS. 4 and 5. If the same position is displayed for a predetermined period of time, the object is determined as a static obstacle and is registered in the map. If the coordinates are changed, the object is determined as a moving obstacle and is not registered in the map.

In addition, even when the object is registered as a static obstacle in the map, if no obstacle is present when the corresponding point is scanned again after a predetermined time, the object can be determined as a moving obstacle and removed from the existing map. For example, even when the object 720 is stored as a static or fixed object in the map, the state stored in the moving object storage unit 220*a* is maintained and then the robot attempts to sense the object 720 during running of the robot. If the corresponding object 720 is not sensed, it may be deleted from the map 210 and also deleted from the moving object storage unit 220*a*.

This is to ensure that, even if the object 720 is determined to be a static obstacle when the object 720 has the same position for a certain period of time at the identified coordinates (10,17) and stored in the map as a fixed object, it can be deleted from the map when the object 720 at the corresponding position moves. In other words, a fixed object that cannot be removed, such as completely fixed structure (wall, glass, column or the like), is stored only in the map. However, objects (information desk, signboard, trash bin and the like) that can be somewhat moved or removed can be easily moved or removed after the state stored in the storage unit 220*a* is maintained for a certain period of time.

For example, if a person may not move at a particular point for a certain period of time, or if people always come and go on the point, because an object may stay on the point, the object may be determined as a static obstacle and may be registered as a fixed object in the map. However, in this case, if no obstacle is present when the point is scanned again after a certain period of time, the object can be removed from the existing map. To this end, even if the object is registered in the map as a fixed object, information of the object can be stored in the moving object storage unit. For example, if the object has mobility of 0 or 1 in the moving object storage unit, the object may be stored in the map. However, when the corresponding position is again sensed, if no object is present, the corresponding object may be deleted from the map.

Figure 9:
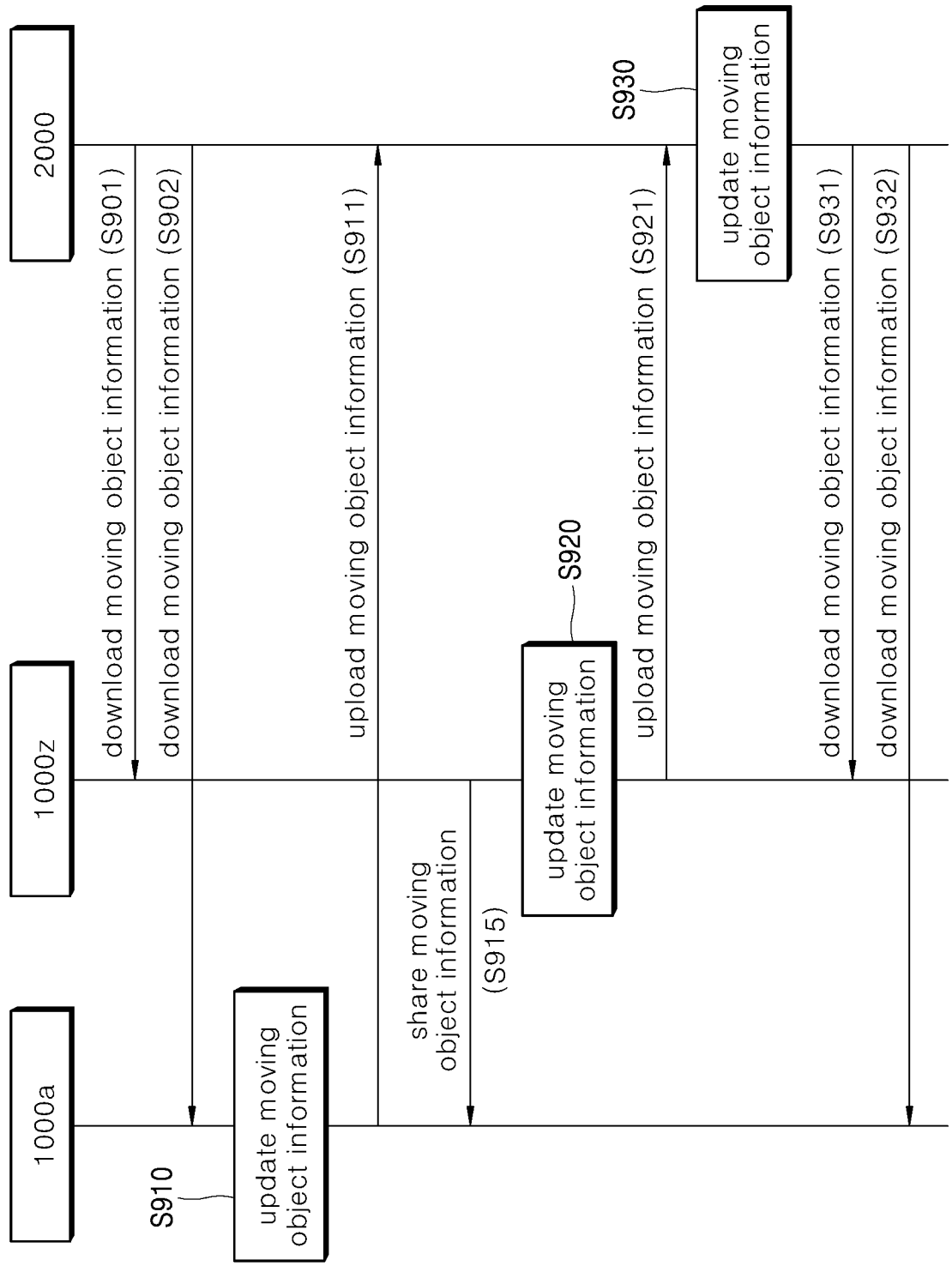
FIG. 9 is a diagram showing a process of exchanging information on a moving object between a plurality of robots or between a robot and a server according to an embodiment of the present disclosure.

The contents stored in the moving object storage unit may be exchanged with other robots via the communication unit 500. FIG. 9 is a diagram showing a process of exchanging information on a moving object between a plurality of robots or between a robot and a server according to an embodiment of the present disclosure.

A server 2000 downloads information on a moving object to a plurality of robots 1000*a*, . . . , 1000*z* (S901 and S902). The robots 1000*a*, . . . , 1000*z* update the received moving object information into the moving object storage unit 220. The server 2000 may analyze the moving object information transmitted by the plurality of robots 1000*a*, . . . , 1000*z*, update information sensed redundantly at the same position newly, and stores the updated information as single information on the moving object. In addition, it is possible to accumulate the history information on whether there is an object that appears and disappears repeatedly at a specific position and to correct and download information on the mobility of the moving object.

Thereafter, the robots 1000*a*, . . . , 1000*z* update the moving object information during running (S910 and S920). In one embodiment, updating the moving object information comprises updating the information of the moving object storage unit held by each robot. In addition, newly acquired information on the moving object may be shared between adjacent robots among the plurality of robots (S915). At this time, the sharing of the information on the moving object can be limited to only robots within a certain range. Alternatively, this information may be provided to a robot that is scheduled to move to the corresponding space. Then, each of the robots 1000*a*, . . . , 1000*z* uploads the moving object information acquired while running to the server (S911 and S921).

The server 2000 updates the received moving object information (S930). In this process, the server 200 rearranges duplicated information into single object information or adjusts the value of the mobility if necessary, and downloads new moving object information (S931 and S932). The adjustment or update of the mobility value means that, when a plurality of robots accumulatively senses the existence of an object at a specific position at a different time and uploads information on the object, the mobility value of the object at the corresponding position is lowered based on this information or is added to a fixed map. Therefore, in the process of downloading the moving object information, the adjustment information on the map may also be downloaded together.

As shown in FIG. 9 or using the control unit 900 and the map storage unit 200 of the robot, it can be confirmed that the object is positioned with a periodicity at a specific position. For example, when accumulatively storing the points at which objects are sensed at a specific position, the robot 1000 can generate a rule in which the objects are located with a cycle at the corresponding position. Based on the generated rule, the robot can move at the point of time at which the object is not located at the corresponding position to perform a function. In addition, the robot 1000 may be provided with information indicating that the object is located with a periodicity at a specific position from the outside, and may move based on the information.

FIG. 10 is a view for explaining storage of periodicity of a moving object in a moving object storage unit according to an exemplary embodiment of the present disclosure. In one embodiment of the present disclosure, in order to store the periodicity of the moving object in the moving object storage unit, a history storage unit 230 may further be comprised in the map storage unit 200. The history storage unit 230 can store the time at which an object is sensed at a specific position and can store the time information sensed by not only the corresponding robot but also other robots. In the process of FIG. 9, information of a sensed object can be stored in various processes of downloading and sharing the moving object information.

Referring to the information stored in the history storage unit 230, the positions where the objects are sensed are accumulatively stored at a (3, 5) position. Considering a stored temporal pattern, it was sensed that an object exists from 10:15 am to 13:15 am every Tuesday. Therefore, since a moving object is located at the (3, 5) position between 10:15 am and 13:15 am every Tuesday (or by adding more time before and after this time), the robot 1000 can perform a function at the corresponding position, out of this time. In one embodiment, the moving object storage unit 220*b* that reflects the contents of 230 can be stored as indicated by 730. Thereafter, if the object is not sensed at (3, 5), information that is not sensed for a predetermined period of time can be confirmed and removed from the moving object storage unit 220*b*.

The process of FIG. 10 may be performed by the robot 1000 or may be performed by the server 2000 as described above. The server 2000 can collect the information provided by the plurality of robots, correct the errors of the values sensed by the robots, confirm the periodicity of the specific position, and provide them back to the plurality of robots.

Figure 11:
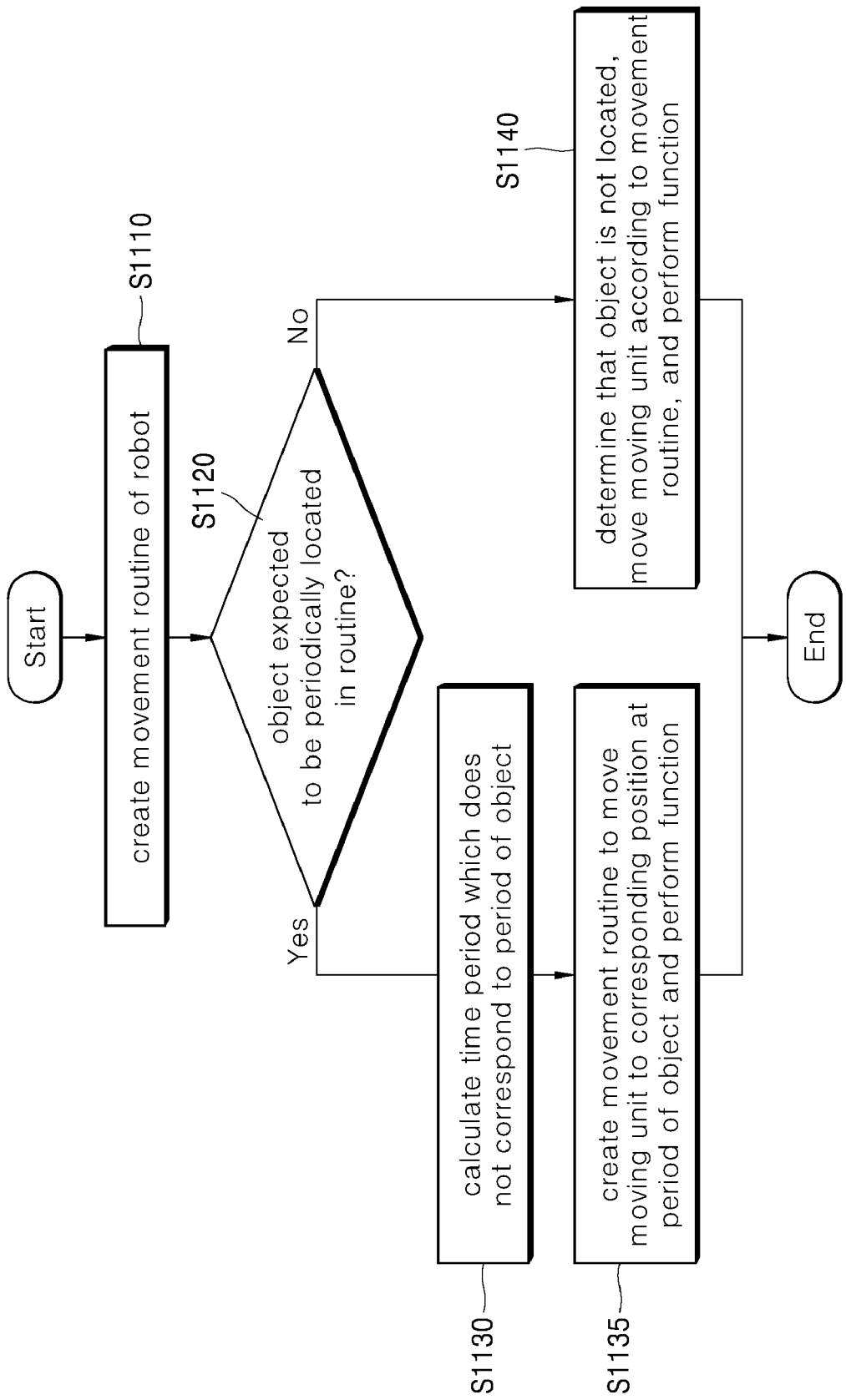
FIG. 11 is a flowchart showing a process of controlling the running of the robot according to an embodiment of the present disclosure.

FIG. 11 is a flowchart showing a process of controlling the running of the robot according to an embodiment of the present disclosure. The control unit 900 of the robot can generate a movement routine before or during movement. In this case, information on the temporal periodicity (Period) of the object shown in FIG. 10 may be confirmed to generate the movement routine. In addition, it is possible to adjust the movement routine to move the robot to a position where the object is expected to not be located to perform a function.

The control unit 900 of the robot generates a movement routine of the robot (S1110). In this process, the control unit 900 confirms whether an object is expected to be periodically located at a position comprised in the movement routine (S1120). When it confirmed that the periodic location is expected, the time period in which the object is not sensed is calculated according to the temporal periodicity of the object. That is, the time period in which the object is not sensed is calculated using the temporal periodicity of the object (S1130). Thereafter, the control unit 900 generates the movement routine to move the robot to the corresponding position of the map in a time period during which the object is not sensed. Then, the control unit 900 can control the moving unit 300 to perform a function while moving according to this routine (S1135). On the other hand, if the periodic location of the object is not expected, the control unit can control the moving unit 300 to perform a function while moving according to the generated movement routine.

FIG. 12 is a view showing an example in which a moving object of a map storage unit is displayed on a map and an example in which a moving object of the map storage unit is not displayed on the map according to an embodiment of the present disclosure.

Reference numeral 1210 denotes a region where both of fixed object and moving object are displayed. Reference numeral 1220 denotes a region where only a fixed object is displayed. Reference numeral 1210 denotes a combination of information of the map 210 and the moving object storage unit 220. Reference numeral 1220 denotes information of the map 210 only. The robot 1000 may generate a movement routine or move to perform a specific function in a space in which only the fixed object is located using the information of 1220 in the process of moving to the specific position. In addition, information on a moving object newly sensed in the moving process can be accumulatively stored, and it can be confirmed whether or not the moving object is fixed, so that the map can be updated.

As indicated by 1220 of FIG. 12, in the process of creating or updating a map by using a laser distance sensor, only the actual outer wall or the stationary objects are registered in the map without registering the dynamic obstacles in the map so that the robot can run with the accurate map information. In addition, when a specific object is removed from the space of the map created at the beginning, the robot can detect that the object has disappeared, and remove it from the map to update the map.

This can use the information indicating that the objects stored in the moving object storage unit are located or removed. The map storage unit 200 separates the map 210 and the moving object storage unit 220 and provides information to the control unit 900 so that the robot can move.

In another embodiment of the present disclosure, both the fixed object and the moving object can be stored in one map. FIG. 13 is a view showing information on a fixed object and a moving object in one map according to another embodiment of the present disclosure. In a map 1310 of FIG. 13, the entire space is divided by 20×20. In this space, a fixed object such as a wall or glass is displayed with a value of 1, and other moving objects are displayed with a value between 2 and 5. A larger value indicates a higher mobility, which means that an object is expected to move dynamically or be removed soon.

Accordingly, the map can be reconstructed based on the values of mobility in the entire map 1310 in the process of movement of the robot. For example, if the control unit controls the map 1310 to display only objects having mobility values of 1 and 2, the robot can move only by identifying a fixed object and a semi-fixed object. In addition, in a situation where there is a lot of floating population, moving objects may stay, and even objects having the mobility value 5 are displayed on the map so that the robot can move.

In the above-described embodiments, dynamic obstacles can be removed when the robot creates or updates the map by utilizing a laser sensor. When the position information of an object detected by the laser sensor is not changed for a predetermined period of time, it is registered in the map. If the registered object is not detected at the same position when the object is scanned again, the object may be removed from the map.

In addition, if a stationary structure not previously displayed on the map is newly located, it can be confirmed whether such a structure is consistently located. If the stationary structure is fixed for a predetermined period or longer, it can be updated as a fixed object of the map. Therefore, it is possible to construct the map by separating a dynamically changing space into a moving object and a fixed object, thereby preventing the robot from being obstructed in the realization of the function due to the moving object. In particular, just if there is a floating population in a space such as an airport, a port or a terminal where the floating population is large, if the entry of the robot into the corresponding space is completely stopped, the function of the robot responsible for cleaning and security of the space may not be fully utilized. Accordingly, in the present disclosure, a laser sensor such as LiDAR can be used to confirm the location of objects and record their dynamic movement on a time basis.

Figure 14:
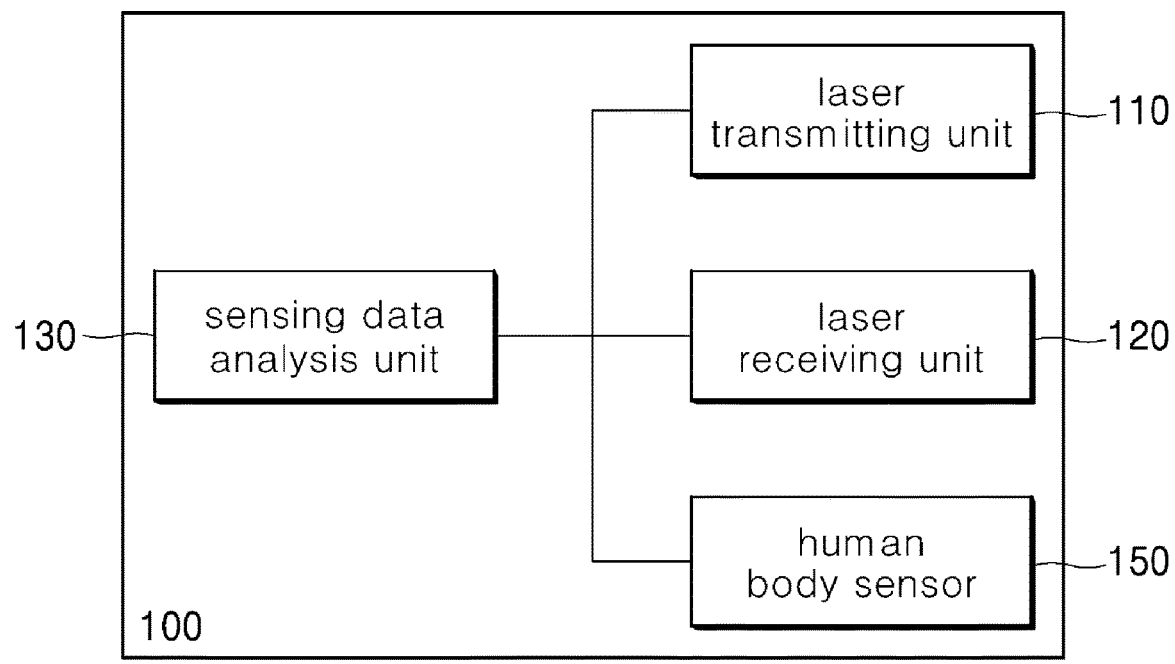
FIG. 14 is a view showing the configuration of a sensing unit according to another embodiment of the present disclosure.

FIG. 14 is a view showing the configuration of a sensing unit according to another embodiment of the present disclosure. Referring to FIG. 14, the sensing unit 100 may further comprise a human body sensor 150 in addition to the LiDAR sensor comprising the laser transmitting unit 110 and the laser receiving unit 120. When the human body sensor 150 is used together with the LiDAR sensor, if a moving object sensed by the LiDAR sensor is a person, the human body sensor 150 provides the sensing data analysis unit 130 with information indicating that a human body has been sensed. The sensing data analysis unit 130 provides the control unit 900 with the already sensed information and the information indicating that the human body has been sensed so that the control unit 900 can set the mobility for the moving object to 5 at all times.

That is, when it is confirmed that an object sensed by the sensing unit 100 is a person, for example, when the human body sensor 150 of the sensing unit 100 senses a person, the control unit can set the mobility of the sensed object to the largest value (for example, 5) and accordingly can create a map with the corresponding object that is likely to always move.

Figure 15:
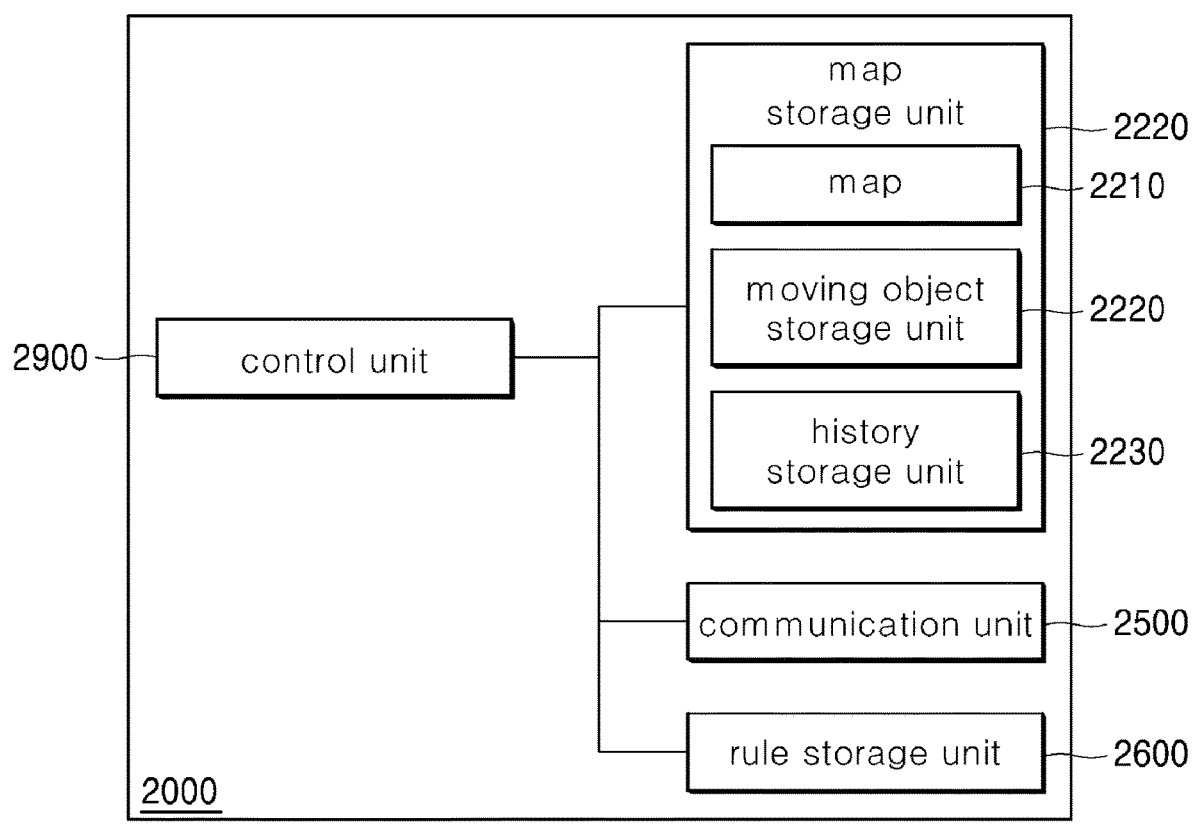
FIG. 15 is a view showing the configuration of a server according to an embodiment of the present disclosure.

FIG. 15 is a view showing the configuration of a server according to an embodiment of the present disclosure. A server 2000 comprises a map storage unit 2200 that stores map information, moving object information and a history generated by robots in the center, a control unit 2900 and a communication unit 2500. A map 2210 stores information on fixed objects. The communication unit 2500 of the server 2000 collects information on moving objects sensed by the robots while moving, and stores the collected information in a moving object storage unit 2220. In addition, a history storage unit 2230 accumulatively stores information of objects located at their respective positions. Based on the stored information, the server 2000 can provide the robots with information on whether or not the objects are located periodically.

In addition, the server 2000 may reflect information on object location at a specific position provided by an airport, a port, a terminal or the like, in the map 2210 or the moving object storage unit 2220 and provide the reflected information to the robots. For example, when an information desk is newly installed for a certain period of time in a region where no object is originally located, information on the region is stored in the map 2210 or the moving object storage unit 2220 in order to prevent the robot from performing an unnecessary sensing operation or modifying the movement routine for reentry into the corresponding region, thereby increasing the efficiency of the robot movement.

In addition, the server 2000 may further comprise a rule storage unit 2600. This unit 2600 uses the history storage unit 2230 to make the periodicity of object location as a rule so that the robots can refer to the rule while moving. For example, when it is confirmed that a moving object is located at (2, 3) every Tuesday and a moving object is also located at (2, 8) every Tuesday, if there is a high location association between them, the (2, 3) and (2, 8) regions are coupled to make a rule that the moving objects are located with periodicity. The rule comprises a rule that is created based on the periodicity of object location calculated in the history storage unit 2230.

Although the features and elements are described in particular combinations in the exemplary embodiments of the present disclosure, each feature or element can be used alone or in various combinations with or without other features and elements. In addition, although each of the features and elements may be implemented as an independent hardware component, some or all of the features and elements may be selectively combined into one or more hardware components with a computer program having a program module that causes the hardware components to perform some or all of the functionality described herein. Codes and code segments of such a computer program will be easily conceivable by those skilled in the art. Such a computer program is stored on a computer-readable storage medium and may be read/executed by a computer to thereby implement the exemplary embodiments of the present disclosure. The storage medium of the computer program comprises a magnetic storage medium, an optical storage medium, a semiconductor storage device, etc. Further, the computer program implementing the exemplary embodiments of the present disclosure comprises a program module transmitted in real-time via an external device.

Aspects of the present disclosure to provide a method for enabling a robot to perform a function by distinguishing a fixed object from a moving object in a space in which changes are frequent, and a robot implementing the method. Another aspect of the present disclosure provides a method of using internal map information so as to discriminate whether an object sensed from the outside is a fixed object or a moving object, and a robot implementing the method. Another object of the present disclosure provides a method for solving a problem that a robot cannot enter an empty space due to the continuous sensing of the floating population, and a robot for implementing the method.

Aspects of the present disclosure are not limited to the above-described objects and other objects and advantages can be appreciated by those skilled in the art from the following descriptions. Further, it will be easily appreciated that the objects and advantages of the present disclosure can be practiced by components recited in the appended claims and a combination thereof.

According to one aspect of the present disclosure, there is provided a method of creating a map by identifying a moving object, comprising: by a sensing unit of a robot, sensing a first object located outside the robot; by a control unit of the robot, calculating mobility of the sensed first object; and storing sensed information and sensed time information of the first object in a map, as a fixed object, when the mobility of the first object calculated by the control unit of the robot is lower than a preset reference.

According to another aspect of the present disclosure, there is provided a robot that creates a map by identifying a moving object, comprising: a moving unit that controls movement of a robot; a map storage unit that stores a map referred to when the robot is moved; a sensing unit that senses a first object located outside the robot; and a control unit that controls the moving unit, the map storage unit and the sensing unit and calculates mobility of the sensed first object, wherein the control unit stores sensed information and sensed time information of the first object in a map, as a fixed object, when the mobility is lower than a preset reference.

According to an embodiment of the present disclosure, since dynamic obstacles are distinguished and stored in a process of creating or modifying a map using a sensor, the robot can travel with accurate map information. According to an embodiment of the present disclosure, even when an object is sensed as a moving object, when the object is located at a corresponding position for a predetermined period or longer, it can be stored as a fixed object which can be confirmed while the robot is traveling.

According to an embodiment of the present disclosure, the robot can enter or travel according to the periodicity of a moving object stored as a fixed object, so that the robot can perform a function. According to an embodiment of the present disclosure, when a moving object stored as a fixed object is removed, the robot senses it and reflects it in a map so that the robot can travel based on a correct map.

Although the exemplary embodiments of the present disclosure have been described for illustrative purposes, those skilled in the art will appreciate that various modifications, additions and substitutions are possible without departing from the scope and spirit of the present disclosure. Accordingly, it will be understood that such modifications, additions and substitutions also fall within the scope of the present disclosure.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present disclosure.

Spatially relative terms, such as "lower", "upper" and the like, may be used herein for ease of description to describe the relationship of one element or feature to another element (s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of controlling a robot, comprising:
   detecting, by a sensor of the robot, a first object located in an environment outside the robot;
   calculating, by a controller of the robot, a mobility value of the first object; and
   updating a map that identifies at least one fixed object in the environment to include sensed information about the first object and time information about when the first object is detected by the sensor, when the mobility value of the first object is lower than a reference value,
   wherein calculating the mobility value includes:
      determining whether a second object is detected at another time at a geographic position associated with the first object; and
      changing the mobility value of the first object according to whether the second object is detected in the geographic position associated with the first object.

2. The method of claim 1, further comprising:
   updating, when the mobility is higher than or equal to the reference value, a moving object memory that identifies one or more moving objects to include the sensed information and the time information.

3. The method of claim 1, wherein the sensed information of the first object includes position information identifying a geographic location where the first object is detected.

4. The method of claim 1, wherein detecting the first object further includes:
   receiving, by the sensor, information about a fixed object within a sensible area,
   determining, by the sensor, whether the first object is detected within the sensible area associated with the fixed object for at least a predetermined period of time.

5. The method of claim 1, wherein calculating the mobility value further includes:
   increasing the mobility value when the map does not identify a fixed object in a detected location of the first object.

6. The method of claim 1, further comprising:
   exchanging, by a communication interface of the robot, information about the first object with another robot or a server.

7. The method of claim 1, wherein the map memory further stores information about a temporal periodicity of a movement of an object.

8. The method of claim 7, further comprising:
   determining, by the controller of the robot, a time period when the object would not be located at a position using the stored information about the temporal periodicity of the object stored in the map memory; and
   controlling, by the controller, the robot to move to the position on the map during the time period.

9. The method of claim 1, wherein calculating the mobility value further includes:
   sensing, by the sensor and after a preset sensing period time, the first object again,
   notifying, by the sensor, the controller of the first object based on confirming that the first object exists for longer than the sensing period time, and changing, by the controller, the sensing period time according to a floating population in the environment.

10. The method of claim 1, wherein the mobility value ranges to a maximum value, and
wherein calculating the mobility value further includes:
setting the mobility value of the first object to the maximum value when the first object is determined to be a person.

11. A robot comprising:
a motor that drives a movement of a robot in an environment;
a map memory that stores a map of the environment and is referred to when the robot is moved;
a sensor that detects a first object located in the environment outside the robot; and
a controller that controls the motor, the map memory and the sensor, and calculates a mobility value of the first object,
wherein the controller updates the map based on sensed information about the first object and time information about when the first object is detected when the mobility value is lower than a reference value, and
wherein the controller, when calculating the mobility value of the first object, further determines whether a second object was previously detected at a position corresponding to the first object, and changes the mobility value of the first object according to whether the second object was previously detected at the position corresponding to the first object.

12. The robot of claim 11, wherein the map includes information identifying at least one fixed object, and
wherein the map memory further includes a moving object memory that stores information on one or more moving objects.

13. The robot of claim 12, wherein, when the mobility value is higher than or equal to the reference value, the controller updates the moving object memory based on the sensed information and the time information.

14. The robot of claim 11, wherein the controller provides information about a fixed object within a sensible area of the sensor, and
wherein the sensor determines whether the first object is detected within the sensible area for at least a predetermined period of time.

15. The robot of claim 11, wherein the controller increases the mobility value when a location associated with a fixed object identified in the map does not match a location of the first object.

16. The robot of claim 11, wherein the map memory stores information identifying a temporal periodicity of a movement of a object.

17. The robot of claim 16, wherein the controller further identifies, using the temporal periodicity of the object stored in the map memory, a time when the object will not be positioned at a particular position, and controls the robot to move to the particular position during the identified time.

18. The robot of claim 11, wherein
the sensor senses the first object again after a preset sensing period time,
the sensor notifies the controller of the first object based on confirming that the first object exists for longer than the sensing period time, and
the controller changes the sensing period time according to a floating population in the environment.

19. A robot comprising:
a motor that drives a movement of a robot in an environment;
a map memory that stores a map of the environment and is referred to when the robot is moved;
a sensor that detects a first object located in the environment outside the robot; and
a controller that controls the motor, the map memory and the sensor, and calculates a mobility value of the first object,
wherein, when the mobility value is lower than a reference value, the controller updates the map based on sensed information about the first object and time information about when the first object is detected;
wherein the sensor further determines whether the first object is a person, and
wherein the controller sets the mobility value of the first object to a maximum value when the sensor determines that the first object is a person.

20. The robot of claim 19, wherein
the sensor senses the first object again after a preset sensing period time,
the sensor notifies the controller of the first object based on confirming that the first object exists for longer than the sensing period time, and
the controller changes the sensing period time according to a floating population in the environment.

* * * * *